US006962467B2

(12) United States Patent
Ryerson et al.

(10) Patent No.: US 6,962,467 B2
(45) Date of Patent: Nov. 8, 2005

(54) METHOD OF REMOVAL OF HYDROCARBONS FROM SOILS USING SOLIDS LOADED POLYMER FOAM

(75) Inventors: James George Ryerson, Fort McMurray (CA); Colin Campbell, Red Deer (CA)

(73) Assignee: Recupetro Resources Ltd., Fort McMurray (CA)

(*) Notice: Subject to any disclaimer, the term of this patent is extended or adjusted under 35 U.S.C. 154(b) by 0 days.

(21) Appl. No.: 10/497,960

(22) PCT Filed: Nov. 5, 2002

(86) PCT No.: PCT/CA02/01679

§ 371 (c)(1),
(2), (4) Date: Jun. 7, 2004

(87) PCT Pub. No.: WO03/039704

PCT Pub. Date: May 15, 2003

(65) Prior Publication Data

US 2005/0019099 A1 Jan. 27, 2005

(30) Foreign Application Priority Data

Nov. 5, 2001 (CA) ............................................ 2361072

(51) Int. Cl.[7] ................................................ B09B 1/00
(52) U.S. Cl. ...................................... 405/128.45; 134/7
(58) Field of Search ......................... 405/128.1, 128.45, 405/128.5, 128.7, 128.75; 210/747; 134/7

(56) References Cited

U.S. PATENT DOCUMENTS 4,066,394 A * 1/1978 Leonard ........................ 8/137
4,563,483 A 1/1986 Smith et al.
5,242,598 A * 9/1993 Shannon et al. ............ 210/690
5,628,943 A 5/1997 Woog
6,251,058 B1 * 6/2001 Ward et al. ................ 588/249

FOREIGN PATENT DOCUMENTS

DE 31 45 667 5/1983
DE 44 29 862 2/1996
DE 197 07 251 8/1998
JP 55 149647 A 11/1980
WO WO 94/21392 9/1994

* cited by examiner

*Primary Examiner*—John Kreck
(74) *Attorney, Agent, or Firm*—Davis & Bujold, P.L.L.C.

(57) ABSTRACT

A method of removal of hydrocarbons from soils using solids-loaded polymer foam. A first step involves providing a solids-loaded polymer foam consisting of an open-celled polymer foam matrix with zeolite dispersed and bound throughout the foam matrix. A second step involves mixing soils containing hydrocarbons, solids-loaded polymer and water. It has been found that hydrocarbons are adsorbed by the solids-loaded polymer foam. The order of mixing can be altered to suit particular applications. A recovery step can be added to recover the hydrocarbons from the solids-loaded polymer foam.

28 Claims, 3 Drawing Sheets

METHOD OF REMOVAL OF HYDROCARBONS FROM SOILS USING SOLIDS LOADED POLYMER FOAM

This application is a national stage completion of PCT/CA02/01679 filed Nov. 5. 2002 which claims priority from Canadian Patent Applicaiton 2,361,072 filed Nov. 5. 2001.

FIELD OF THE INVENTION

The present invention relates to a method of removal of hydrocarbons from soils using solids-loaded polymer foam.

BACKGROUND OF THE INVENTION

There is a need for a more effective and financially viable manner of removing hydrocarbons from soils. The need manifests itself in environmental cleanup of hydrocarbon contaminated lands, such as those lands surrounding oil wells and gas storage tanks. Often the cost of environmental cleanup exceeds the commercial value of the land. It is not unusual for the environmental cleanup to largely consist of removal of contaminated soils to landfill sites. The need also manifests itself in commercial recovery of hydrocarbons, such as the recovery of recovery from oil sands.

The present invention relates to removing hydrocarbons from soils using solids-loaded polymer foam. Solids-loaded polymer foam is known. U.S. Pat. No. 4,563,483 (Smith et al 1986) entitled "Concrete Cleaning Composition" describes the use of solids-loaded polyurethane foam to clean concrete. Abrasive solids are dispersed and bound throughout the polyurethane foam matrix. The choice of abrasive material is made from a wide variety of materials of adequate hardness and of a particulate size range which will enable them to effectively scour concrete, brick or stone surfaces and to loosen dirt or other debris held thereto by oil. The Smith et al reference uses a silane-coupling agent to bond the abrasive particles to the foam matrix. For this reason, the Smith et al reference teaches that the abrasive particles are preferably chosen from substances which are capable of forming reactive sites for the silane-coupling agents.

SUMMARY OF THE INVENTION

The present invention relates to a method by which solids-loaded polymer foam can be used to remove hydrocarbons from soils.

According to the present invention there is provided a method of removal of hydrocarbons from soils using solids-loaded polymer foam. A first step involves providing a solids-loaded polymer foam consisting of an open-celled polymer foam matrix with zeolite dispersed and bound throughout the foam matrix. A second step involves mixing soils containing hydrocarbons, solids-loaded polymer and water. It has been found that hydrocarbons are adsorbed by the solids-loaded polymer foam.

The Smith et al reference introduced solid particles into polymer foam to serve as abrasives. It has been discovered that zeolite loaded polymer foam has some special properties which results in the zeolite loaded polymer foam drawing hydrocarbons out of soils. In accordance with the teachings of the present invention the zeolite in the solids-loaded polymer foam does not serve as an abrasive, it serves to draw the hydrocarbons into the polymer foam. It is believed that this special property that zeolite has to draw hydrocarbons into the polymer foam is linked to the cation exchange capacity of zeolite. While different polymer foams can be used for this method, a polymer foam that is commercially available and provides good results with this method is polyurethane foam.

The three elements (soils containing hydrocarbons, solids-loaded polymer foam and water) can be added together simultaneously or in a different order. Each method of mixing has advantages that suit particular circumstances. One method of mixing is to have the solids-loaded polymer foam dry mixed with soils containing hydrocarbons prior to adding water. It has been found that this method of mixing requires less water. Another method of mixing is to have the soils containing hydrocarbons mixed with water prior to adding solids-loaded polymer foam. It is believed that this has advantages when trying to recover viscose hydrocarbons. Yet another method of mixing it to have the solids-loaded polymer foam wet mixed with water prior to being brought into contact with soils containing hydrocarbons. It is believed that this method of mixing facilitates in situ recovery of hydrocarbons from soils.

Although beneficial results may be obtained through the use of the method, as described above, even more beneficial results may be obtained by including a hydrocarbon recovery step. While hydrocarbon recovery may not be of paramount concern in environmental clean up applications, other applications are not commercially viable unless the hydrocarbons can be recovered and some value realized for the hydrocarbons. It is preferred that the solids-loaded polymer foam be mechanically compressed to recover the hydrocarbons. It has been discovered that the polymer foam does not readily release hydrocarbons. The hydrocarbon cannot be effectively removed through the use of a centrifuge, nor can it be effectively removed by the application of heat. If only small quantities of hydrocarbon are present in the solids-loaded polymer foam, it cannot be released by mechanically compressing; as the hydrocarbon is held by the zeolite and moves within the solids-loaded polymer foam. However, when the solids-loaded polymer foam is substantially saturated with hydrocarbons, mechanically compressing the polymer foam will squeeze out excess hydrocarbons. This recovery step also facilitates a solids-loaded polymer foam recycling step of reusing the solids-loaded polymer foam for further hydrocarbon recovery.

Although beneficial results may be obtained through the use of the method, as described above, even more beneficial results may be obtained with the solids-loaded polymer foam being shredded. The shredding into small chunks or particles makes the polymer foam easier to handle, facilitates mixing and increases surface contact area.

Although the water used may be heated, one of the major advantages of this method is that cold water can be used. By "cold" water, it is meant that the water is used at its ambient temperature. It is not essential to use hot water in order to obtain beneficial results. The cost savings and environmental benefits obtained through cold water processing are substantial. Environmental benefits can also be obtained by including a water recycling step of reusing the water for further hydrocarbon recovery. The water can be repeatedly reused without adversely affecting the removal and recovery process.

It is preferred that solids-loaded polymer foam be used that will float when saturated with oil, although polymer foam that sinks when saturated can be used. In some applications this may be beneficial, and the solids-loaded polymer foam may be removed from the bottom of the slurry. However, as the soils will also tend to settle to the bottom of the slurry; it is preferred that small shredded chunks of solids-loaded polymer foam that float even when saturated be used. This enables the solids-loaded polymer foam to be removed from the slurry by skimming.

The amount of zeolite in the polymer foam can be varied and beneficial results obtained. Even 1% zeolite will bring some beneficial results. It has been found, however, that for best results there should be at least 5% by weight of the solids-loaded polymer foam. Of course, the greater the quantity of zeolite the more pronounced the ability of the polymer foam to adsorb hydrocarbons.

Natural zeolite is commercially available, as is synthetic zeolite. It is preferred that natural zeolite be used. It has been found that, when reused repeatedly, the synthetic zeolite tends to break down.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Three preferred methods will now be described with reference to FIGS. 1 through 3. All of the described methods involve two common steps. A first step involves providing a solids-loaded polymer foam consisting of an open-celled polymer foam matrix with zeolite dispersed and bound throughout the foam matrix. A second step involves mixing soils containing hydrocarbons, solids-loaded polymer and water. Hydrocarbons are adsorbed by the solids-loaded polymer foam. The difference between the three preferred methods lies in the order in which the three elements of solids-loaded polymer foam, soils containing hydrocarbons and water are mixed.

Figure 1:
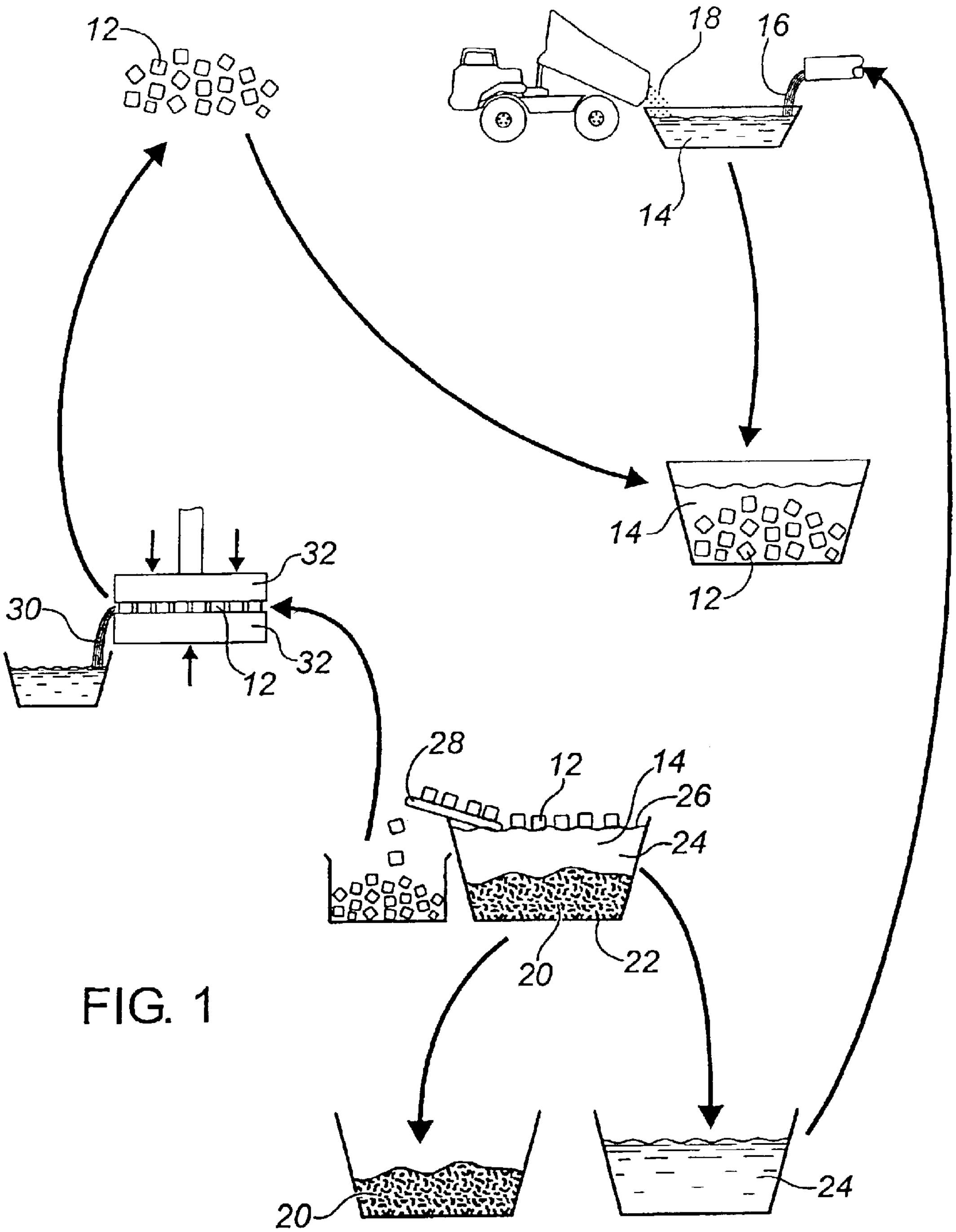
FIG. 1 is a processing flow diagram illustrating a first mixing order of soils containing hydrocarbons and water, then adding solids-loaded polymer foam.

Referring to FIG. 1, there is illustrated a method of removal of hydrocarbons from soils using solids-loaded polymer foam which includes a first mixing order that involves providing shredded solids-loaded polymer foam 12 consisting of an open-celled polyurethane foam substrate with zeolite dispersed and bound throughout the foam matrix. Zeolite is at least 5% by weight of the shredded solids-loaded polymer foam and is natural zeolite, as opposed to synthetic zeolite.

A cold slurry 14 is formed of cold water 16 and soils containing hydrocarbons 18. Shredded solids-loaded polymer foam 12 is mixed into cold slurry 14, whereby hydrocarbons in cold slurry 14 are adsorbed by shredded solids-loaded polymer foam 12. In cold slurry 14, solids 20 will tend to settle at the bottom 22 of cold slurry 14, a water layer 24 will form above solids 20, while shredded solids-loaded polymer foam 12 (with adsorbed hydrocarbons) will tend to rise to the top 26 of cold slurry 14. Shredded solids-loaded polymer foam 12 will float and can be removed by skimming. In the illustrated embodiment, a conveyer type of skimmer 28 is used however it will be appreciated that other methods can be used to skim shredded solids-loaded polymer foam 12 from water layer 24.

Shredded solids-loaded polymer foam 12 is mechanically compressed to recover the hydrocarbons 30. In the illustrated embodiment, two compression blocks 32 are used to compress shredded polymer foam 12, however it will be appreciated that other mechanical devices can be used to effectively compress shredded polymer foam 12. After hydrocarbons 30 have been removed, shredded solids-loaded polymer foam 12 can be recycled for use again in hydrocarbon recovery. Water layer 24 recovered can also be recycled and reused as cold water 16 for further hydrocarbon recovery.

Figure 2:
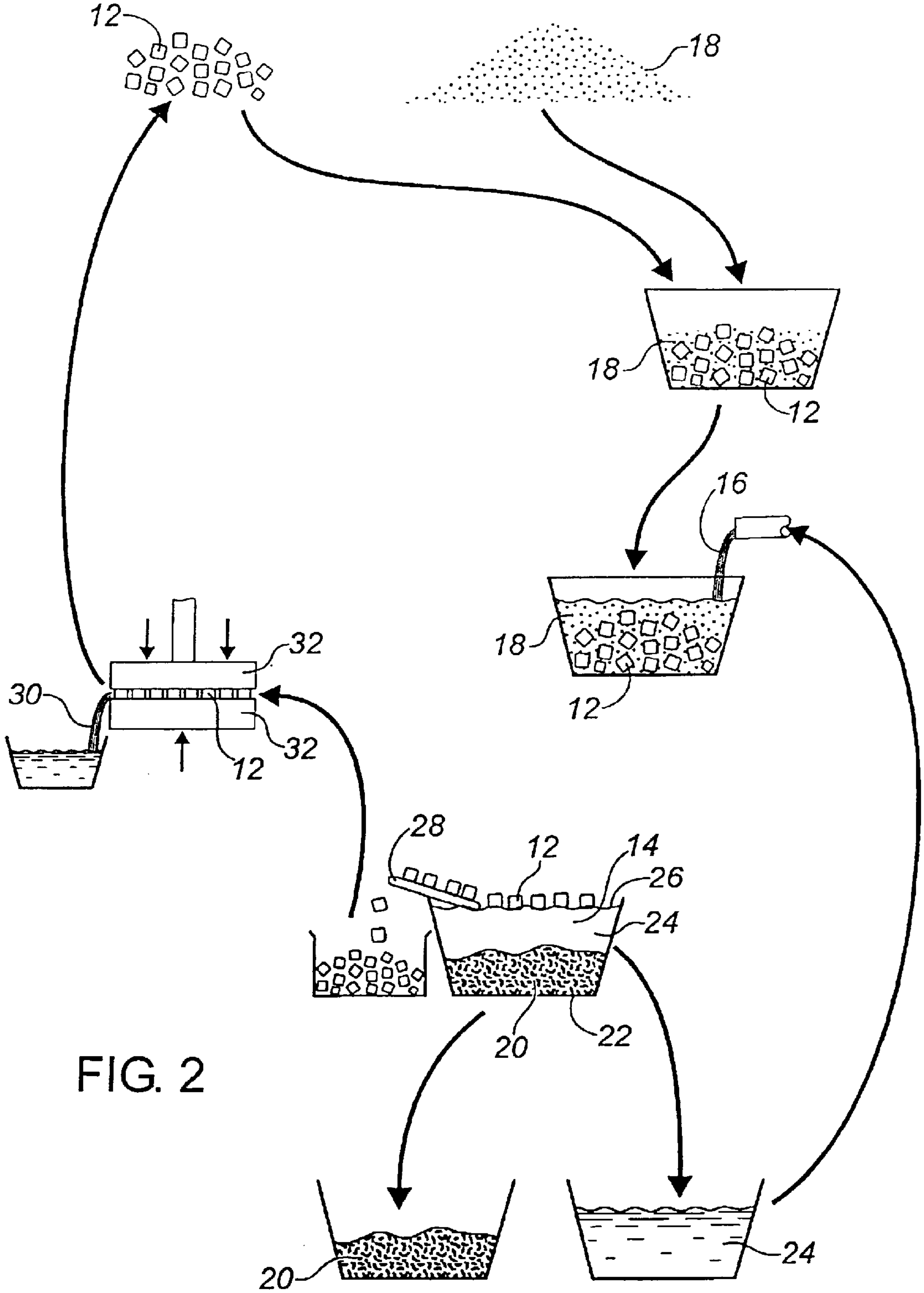
FIG. 2 is a processing flow diagram illustrating a second mixing order of soils containing hydrocarbons and solids-loaded polymer foam, then adding water.

Referring to FIG. 2, there is illustrated a method of removal of hydrocarbons from soils using solids-loaded polymer foam involving a second mixing order where shredded solids-loaded polymer foam 12 is dry mixed with soils containing hydrocarbons 18 prior to adding water 16. Once shredded solids-loaded polymer foam 12 has been dry mixed with soils containing hydrocarbons 18, water 16 is added (preferably cold water to save expense). Once water 16 is added, hydrocarbons are adsorbed by shredded solids-loaded polymer foam 12. The mixture tends to separate into layers with solids 20 settling at the bottom 22 of the mixture 34 and shredded solids-loaded polymer foam 12 will float on top 26 of water layer 24. Shredded solid-loaded polymer foam 12 can then be removed by skimming. Shredded solids-loaded polymer foam 12 can be mechanically compressed to recover the hydrocarbons 30. After removal of hydrocarbons 30, shredded solids-loaded polymer foam 12 can be recycled for use again in hydrocarbon recovery. It has been found that by dry mixing shredded solids-loaded polymer foam 12 with soils containing hydrocarbons 18 prior to adding water 16, less water is required.

Figure 3:
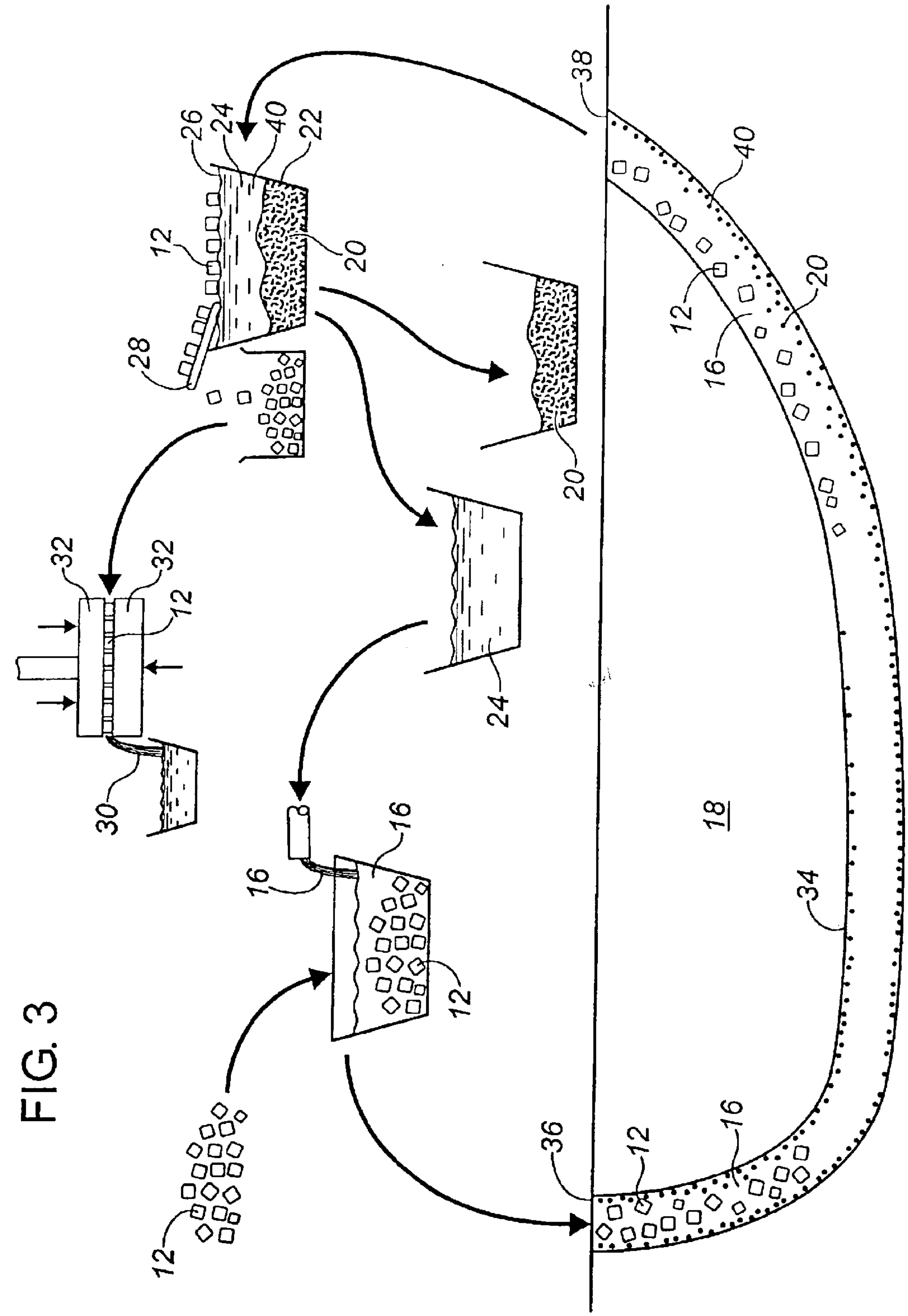
FIG. 3 is a processing flow diagram illustrating a third mixing order of solids-loaded polymer foam and water, then bringing into contact with soils containing hydrocarbons.

Referring to FIG. 3, there is illustrated a method of removal of hydrocarbons from soils by use of a third mixing order which involves wet mixing shredded solids-loaded polymer 12 with water 16 prior to being brought into contact with soils containing hydrocarbons 18. It has been found that this method of mixing is well suited to in situ recovery of hydrocarbons from soils.

In the illustrated embodiment, there is provided an earth formation, generally indicated by reference numeral 34, that is made up of soils containing hydrocarbons 18. An inlet well 36 and an outlet well 38 are drilled into earth formation 34 in spaced relation. Shredded solids-loaded polymer 12 is wet mixed with water 16 and then fed into inlet well 36. The shredded solids-loaded polymer 12 and water 16 tend to migrate through earth formation to outlet well 38. In the process of migrating through earth formation 34, the shredded solids-loaded polymer 12 comes into contact with soils containing hydrocarbons 18. Hydrocarbons are adsorbed by shredded solids-loaded polymer foam 12. It will appreciated that in order to permit migration through earth formation 34, that solids-loaded polymer foam 12 must be finely shredded. Some solids will tend to settle in outlet well 38. A mixture 40 exiting outlet well 38 is then subjected to further treatment. Solids 20 will tend to settle at the bottom 22 with a water layer 24 forming above solids 20. Solids-loaded polymer foam 12 (with adsorbed hydrocarbons) will tend to rise to the top 26 and float on water layer 24. As described with first order of mixing and second order of mixing, shredded solids-loaded polymer foam 12 floating on water layer 24 and can then be removed by skimming. Shredded solids-loaded polymer foam 12 can then be mechanically compressed to recover the hydrocarbons 30.

After hydrocarbons 30 have been removed, shredded solids-loaded polymer foam 12 can be recycled for use again in hydrocarbon recovery. Water layer 24 recovered can also be recycled and reused as cold water 16 for further hydrocarbon recovery.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that. modifications may be made to the illustrated embodiment without departing from the spirit and scope of the invention as hereinafter defined in the Claims.

What is claimed is:

1. A method of removal of hydrocarbons from soils using solids-loaded polymer foam, comprising the steps of:

providing a solids-loaded polymer foam consisting of an open-celled polymer foam matrix with zeolite dispersed and bound throughout the foam matrix; and mixing soils containing hydrocarbons, solids-loaded polymer and water, hydrocarbons being adsorbed by the solids-loaded polymer foam.

2. The method as defined in claim 1, the solids-loaded polymer foam being dry mixed with soils containing hydrocarbons prior to adding water.

3. The method as defined in claim 1, the soils containing hydrocarbons being mixed with water prior to adding solids-loaded polymer foam.

4. The method as defined in claim 1, the solids-loaded polymer foam being wet mixed with water prior to being brought into contact with soils containing hydrocarbons.

5. The method as defined in claim 1, including a hydrocarbon recovery step of mechanically compressing the solids-loaded polymer foam to recover the hydrocarbons.

6. The method as defined in claim 1, the solids-loaded polymer foam being shredded, thereby facilitating mixing and increasing surface contact area.

7. The method as defined in claim 1, the polymer foam being polyurethane foam.

8. The method as defined in claim 1, the water being cold water.

9. The method as defined in claim 1, the solids-loaded polymer foam being removed from the mixture by skimming.

10. The method as defined in claim 1, the zeolite being at least 5% by weight of the solids-loaded polymer foam.

11. The method as defined in claim 1, the zeolite being natural zeolite, as opposed to synthetic zeolite.

12. The method as defined in claim 5, including a polymer foam recycling step of reusing the solids-loaded polymer foam for further hydrocarbon recovery.

13. The method as defined in claim 1, including a water recycling step of reusing the water for further hydrocarbon recovery.

14. A method of removal of hydrocarbons from soils using solids-loaded polymer foam, comprising the steps of:

providing shredded solids-loaded polymer foam consisting of an open-celled polyurethane foam substrate with zeolite dispersed and bound throughout the foam matrix, the zeolite being at least 5% by weight of the shredded solids-loaded polymer foam;

forming a cold slurry of cold water and soils containing hydrocarbons;

mixing the shredded solids-loaded polymer foam into the cold slurry, whereby hydrocarbons in the cold slurry are adsorbed by the shredded solids-loaded polymer foam; and mechanically compressing the shredded solids-loaded polymer foam to recover the hydrocarbons.

15. The method as defined in claim 14, the shredded solids-loaded polymer foam being removed from the cold slurry by skimming.

16. The method as defined in claim 14, the zeolite being natural zeolite, as opposed to synthetic zeolite.

17. The method as defined in claim 14, including a polymer foam recycling step of reusing the shredded solids-loaded polymer foam for hydrocarbon recovery.

18. The method as defined in claim 14, including a water recycling step of reusing the cold water for further hydrocarbon recovery.

19. A method of removal of hydrocarbons from soils using solids-loaded polymer foam, comprising the steps of:

providing shredded solids-loaded polymer foam consisting of an open-celled polyurethane foam substrate with zeolite dispersed and bound throughout the foam matrix, the zeolite being at least 5% by weight of the shredded solids-loaded polymer foam;

dry mixing soils containing hydrocarbons with the solids-loaded polymer foam;

adding cold water to the soils containing hydrocarbons mixed with the shredded solids-loaded polymer foam to form a cold slurry, whereby hydrocarbons in the cold slurry are adsorbed by the shredded solids-loaded polymer foam; and mechanically compressing the shredded solids-loaded polymer foam to recover the hydrocarbons.

20. The method as defined in claim 19, the shredded solids-loaded polymer foam being removed from the cold slurry by skimming.

21. The method as defined in claim 19, the zeolite being natural zeolite, as opposed to synthetic zeolite.

22. The method as defined in claim 19, including a polymer foam recycling step of reusing the shredded solids-loaded polymer foam for hydrocarbon recovery.

23. The method as defined in claim 19, including a water recycling step of reusing the cold water for further hydrocarbon recovery.

24. A method of removal of hydrocarbons from soils using solids-loaded polymer foam, comprising the steps of:

providing shredded solids-loaded polymer foam consisting of an open-celled polyurethane foam substrate with zeolite dispersed and bound throughout the foam matrix, the zeolite being at least 5% by weight of the shredded solids-loaded polymer foam;

providing an inlet well, an outlet well, with hydrocarbon bearing soils positioned in an earth formation between the inlet well and the outlet well;

injecting water and the solids-loaded polymer foam into the inlet well; and recovering the solids-loaded polymer foam at the outlet well and mechanically compressing the shredded solids-loaded polymer foam to recover the hydrocarbons.

25. The method as defined in claim 24, the water being cold water.

26. The method as defined in claim 24, the zeolite being natural zeolite, as opposed to synthetic zeolite.

27. The method as defined in claim 24, including a polymer foam recycling step of reusing the shredded solids-loaded polymer foam for hydrocarbon recovery.

28. The method as defined in claim 24, including a water recycling step of reusing the cold water for further hydrocarbon recovery.

* * * * *